(12) United States Patent
Lee et al.

(10) Patent No.: US 9,448,638 B2
(45) Date of Patent: Sep. 20, 2016

(54) MOBILE DEVICES FOR TRANSMITTING AND RECEIVING DATA USING GESTURE

(71) Applicant: SAMSUNG ELECTRONICS CO., LTD., Suwon-si (KR)

(72) Inventors: Kyoobin Lee, Seoul (KR); Hyun Surk Ryu, Hwaseong-si (KR); Keun Joo Park, Seoul (KR); Joon Ah Park, Seoul (KR); Chang Kyu Choi, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/103,371

(22) Filed: Dec. 11, 2013

(65) Prior Publication Data
US 2014/0232635 A1     Aug. 21, 2014

(30) Foreign Application Priority Data

Feb. 20, 2013    (KR) ........................ 10-2013-0017785

(51) Int. Cl.
| | |
|---|---|
| *G09G 5/00* | (2006.01) |
| *G06F 3/01* | (2006.01) |
| *G06F 3/03* | (2006.01) |
| *G06F 3/0346* | (2013.01) |
| *G06F 3/0354* | (2013.01) |
| *H04M 1/725* | (2006.01) |

(52) U.S. Cl.
CPC ............ *G06F 3/017* (2013.01); *G06F 3/0304* (2013.01); *G06F 3/0346* (2013.01); *G06F 3/03547* (2013.01); *H04M 1/7253* (2013.01); *H04M 2250/64* (2013.01)

(58) Field of Classification Search
None
See application file for complete search history.

(56) References Cited

U.S. PATENT DOCUMENTS

| | | | |
|---|---|---|---|
| 7,728,269 B2 | 6/2010 | Lichtsteiner et al. | |
| 2010/0299390 A1* | 11/2010 | Alameh et al. | ............... 709/204 |
| 2011/0065459 A1 | 3/2011 | Cheng et al. | |
| 2011/0252317 A1* | 10/2011 | Keranen et al. | ............... 715/702 |

FOREIGN PATENT DOCUMENTS

| | | |
|---|---|---|
| KR | 10-2010-0121997 A | 11/2010 |
| KR | 10-2011-0043815 A | 4/2011 |
| KR | 10-2012-0079370 A | 7/2012 |

* cited by examiner

*Primary Examiner* — Nicholas Lee
(74) *Attorney, Agent, or Firm* — Sughrue Mion, PLLC (57) ABSTRACT

A mobile device configured for data transmission to a corresponding mobile device is provided. The mobile device may include a gesture input unit configured to receive a gesture, a gesture determination unit configured to determine whether the gesture corresponds to a preset gesture associated with a command to perform data transmission to the corresponding mobile device, and a data communication unit configured to transmit a data transmission request to the corresponding mobile device based on a result of the determination, configured to receive, from the corresponding mobile device, an acceptance signal indicating an input of an acceptance gesture at the corresponding mobile device, and configured to transmit data to the corresponding mobile device in response to receiving the acceptance signal.

20 Claims, 8 Drawing Sheets

MOBILE DEVICES FOR TRANSMITTING AND RECEIVING DATA USING GESTURE

CROSS-REFERENCE TO RELATED APPLICATION

This application claims priority from Korean Patent Application No. 10-2013-0017785, filed in the Korean Intellectual Property Office on Feb. 20, 2013, the disclosure of which is incorporated herein by reference in its entirety.

BACKGROUND

1. Field

Apparatuses and methods consistent with exemplary embodiments in the following description relate to mobile devices for transmitting and receiving data using a gesture.

2. Description of the Related Art

As the production and consumption of digital content continues to increase, there is a consumer demand for transmitting and receiving various digital content, e.g., pictures, videos, business cards, game items, digital gifts, etc., in an easier and more exciting manner.

SUMMARY

According to an aspect of an exemplary embodiment, there is provided a mobile device configured for data transmission to a corresponding mobile device. The mobile device includes a gesture input unit configured to receive a gesture, a gesture determination unit configured to determine whether the gesture corresponds to a preset gesture associated with a command to perform data transmission to the corresponding mobile device, and a data communication unit configured to transmit a data transmission request to the corresponding mobile device based on a result of the determination, configured to receive, from the corresponding mobile device, an acceptance signal indicating an input of an acceptance gesture at the corresponding mobile device, and configured to transmit data to the corresponding mobile device in response to receiving the acceptance signal.

The preset gesture corresponding to the data transmission request and the preset gesture corresponding to the data transmission acceptance may include a directionality based on a relative location between the mobile device and the corresponding mobile device.

The mobile device may further include a relative location measuring unit to measure a relative location of the corresponding mobile device, wherein the gesture determination unit may include a directionality extracting unit configured to extract a directionality of the gesture associated with the data, and a directionality determining unit configured to determine whether the directionality is in a direction of the relative location to determine whether the gesture associated with the data corresponds to the preset gesture corresponding to the data transmission request.

The directionality determining unit may be further configured to determine that the gesture associated with the data corresponds to the preset gesture that corresponds to the data transmission request in response to the directionality of the gesture being determined to be in the direction of the relative location, and in response to the preset gesture that corresponds with the data transmission acceptance also having the directionality.

The relative location measuring unit may include a location measuring unit configured to measure a location of the mobile device, an orientation measuring unit configured to measure an orientation of the mobile device, an obtaining unit configured to obtain a location of the corresponding mobile device and an orientation of the corresponding mobile device, and a relative location calculating unit configured to calculate the relative location based on the location of the mobile device, the orientation of the mobile device, the location of the corresponding mobile device, and the orientation of the corresponding mobile device.

The mobile device may further include a display configured to display an image representing the data transmission, and a display control unit configured to control the display to display an entirety or a portion of the image based on an output from the gesture determination unit.

The gesture determination unit may further include a movement distance measuring unit configured to measure a movement distance of the gesture associated with the data in a direction towards the relative location, and wherein the display control unit may be further configured to control the display to display a portion of the image based on the direction towards the relative location and the movement distance.

The data communication unit may be configured to transmit the image, the direction towards the relative location, and the movement distance to the corresponding mobile device, and wherein the corresponding mobile device may be configured to display a remaining portion of the image based on the image, the direction towards the relative location, and the movement distance.

The preset gesture corresponding to the data transmission acceptance may include the directionality of a location corresponding to the portion of the image.

The preset gesture corresponding to the data transmission request and the preset gesture corresponding to the data transmission acceptance may include a mutually concurrent gesture.

The data transmission may be determined based on a preset security level corresponding to the mutually concurrent gesture.

The mutual concurrent gesture may include a handshake gesture between a user of the mobile device and a user of the corresponding mobile device, and wherein the data may include business card information of the user of the mobile device.

The gesture determination unit may be further configured to extract a pose of the gesture associated with the data transmission, and the data communication unit may be further configured to transmit the data to the corresponding mobile device using a transmission mode corresponding to the pose of the gesture among a plurality of preset data transmission modes.

The gesture input unit may further include an event-based image sensor, wherein the event-based image sensor may include a sensor configured to detect a preset event occurring in a plurality of image pixels and configured to output an event signal in response to the detection, a time stamp unit configured to generate time stamp information by mapping at least one pixel corresponding to the event signal to a time in which the event signal is output, and an optical flow generating unit configured to generate an optical flow based on the time stamp information in response to the event signal being output.

The optical flow generating unit may include a neighboring pixel obtaining unit configured to obtain neighboring pixels of the at least one pixel, a time difference calculating unit configured to calculate information associated with a time difference between the at least one pixel and the neighboring pixels using the time stamp information, a distance difference calculating unit configured to calculate information associated with a distance difference between the at least one pixel and the neighboring pixels, and an optical flow calculating unit configured to calculate the optical flow based on the information associated with the time difference and the information associated with the distance difference.

According to an aspect of another exemplary embodiment, there is provided a mobile device configured to receive data from a corresponding mobile device, the mobile device including a data communication unit configured to receive a data transmission request from the corresponding mobile device, a gesture input unit configured to receive a gesture in response to the data transmission request being received, and a gesture determination unit configured to determine whether the gesture corresponds to a preset gesture associated with a data transmission acceptance, wherein the data communication unit is further configured to transmit an acceptance signal to the corresponding mobile device based on a result of the determination in response to the data transmission request, and is further configured to receive the data from the corresponding mobile device in response to the data communication unit transmitting the acceptance signal.

The mobile device may further include a relative location obtaining unit configured to obtain a relative location of the corresponding mobile device, wherein the gesture determination unit may include a directionality extracting unit configured to extract a directionality of the gesture associated with the data, and a directionality determining unit may be configured to determine whether the directionality corresponds in a direction of the relative location to determine whether the gesture associated with the data corresponds to the preset gesture corresponding to the data transmission acceptance.

The preset gesture corresponding to the data transmission request and the preset gesture corresponding to the data transmission acceptance may include a mutually concurrent gesture.

According to an aspect of another exemplary embodiment, there is provided a method of a mobile device transmitting data in response to a gesture. The method includes detecting a gesture at a sensor, determining, at the mobile device, whether the gesture corresponds to a request gesture stored in a memory at the mobile device, transmitting a data transmission request to another mobile device in response to the determining that the gesture corresponds to the request gesture, and transmitting data to the other mobile device in response to receiving a data transmission acceptance from the other mobile device.

According to an aspect of another exemplary embodiment, there is provided a method of a mobile device receiving data in response to a gesture. The method includes detecting a gesture at a sensor, determining, at the mobile device, whether the gesture corresponds to an acceptance gesture stored in a memory of the mobile device, transmitting a data transmission acceptance to another mobile device in response to receiving a data transmission request from the other mobile device and in response to the determining that the gesture corresponds to the acceptance gesture, and receiving data from the other mobile device in response to transmitting the data transmission acceptance to the other mobile device.

Other features and aspects will be apparent from the following detailed description, the drawings, and the claims.

BRIEF DESCRIPTION OF THE DRAWINGS

The above and other aspects will become more apparent by describing certain exemplary embodiments with reference to the accompanying drawings in which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

The term " . . . unit" used in the embodiments indicates a component including software or hardware, such as a Field Programmable Gate Array (FPGA) or an Application-Specific Integrated Circuit (ASIC), and the " . . . unit" performs certain roles. However, the " . . . unit" is not limited to software or hardware. The " . . . unit" may be configured to be included in an addressable storage medium or to reproduce one or more processors. Therefore, for example, the " . . . unit" includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and " . . . units" may be combined into a smaller number of components and " . . . units", or further divided into additional components and " . . . units".

The term "module" as used herein means, but is not limited to, a software or hardware component, such as an FPGA or ASIC, which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although the terms used herein are generic terms which are currently widely used and are selected by taking into consideration functions thereof, the meanings of the terms may vary according to the intentions of persons skilled in the art, legal precedents, or the emergence of new technologies. Furthermore, some specific terms may be randomly selected by the applicant, in which case the meanings of the terms may be specifically defined in the description of the exemplary embodiment. Thus, the terms should be defined not by simple appellations thereof but based on the meanings thereof and the context of the description of the exemplary embodiment. As used herein, expressions such as "at least one of," when preceding a list of elements, modify the entire list of elements and do not modify the individual elements of the list.

It will be understood that when the terms "includes," "comprises," "including," and/or "comprising," when used in this specification, specify the presence of stated elements and/or components, but do not preclude the presence or addition of one or more elements and/or components thereof. As used herein, the term "module" refers to a unit that can perform at least one function or operation and may be implemented utilizing any form of hardware, software, or a combination thereof.

Figure 1:
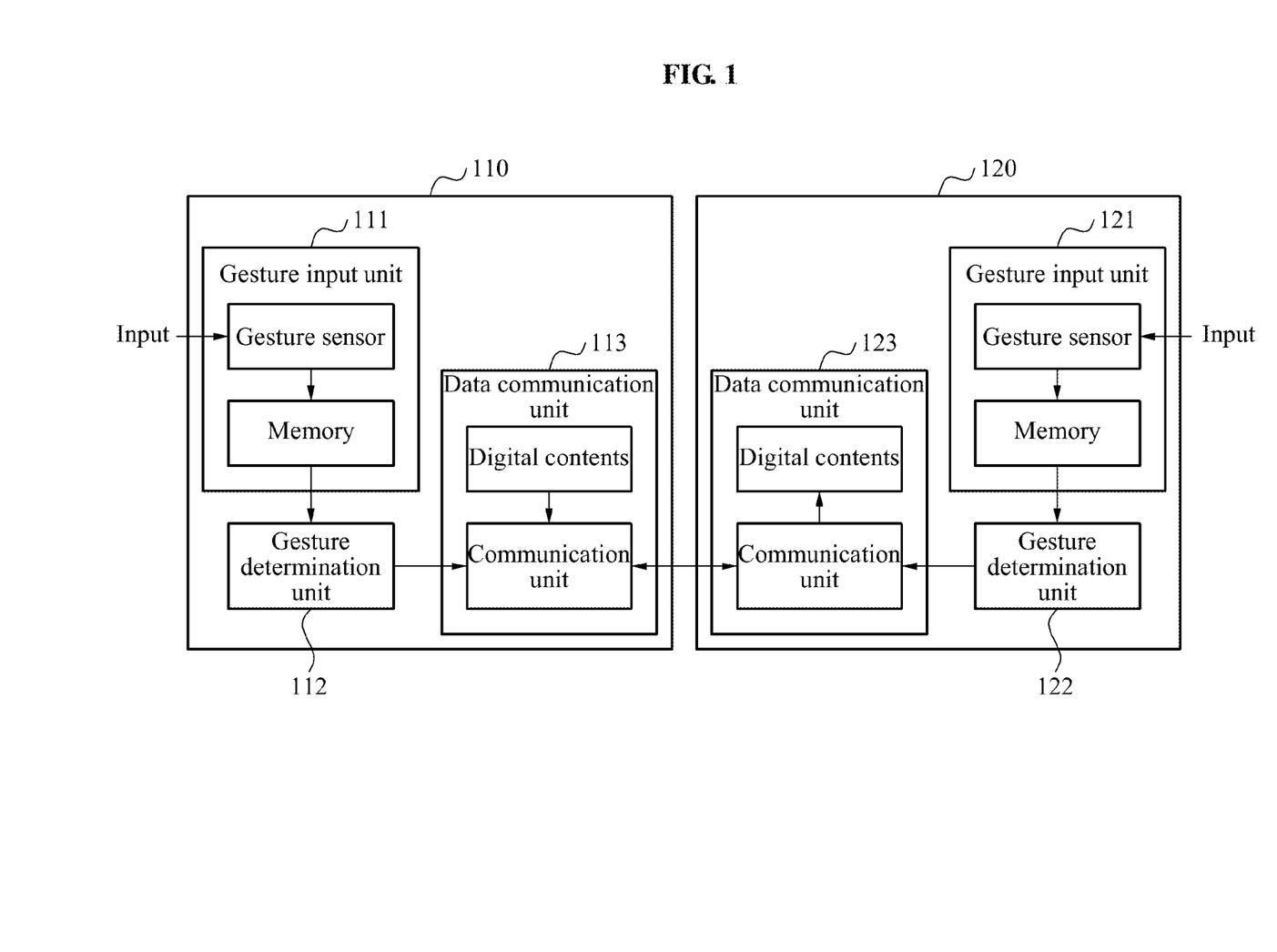
FIG. 1 is a block diagram illustrating a data transmitting terminal and a data receiving terminal using a gesture according to an exemplary embodiment.

FIG. 1 is a block diagram illustrating a data transmitting terminal 110 and a data receiving terminal 120 using a gesture according to an exemplary embodiment.

Referring to FIG. 1, and in accordance with one or more exemplary embodiments, the data transmitting terminal 110 may include a gesture input unit 111, a gesture determination unit 112, and a data communication unit 113. Further, the data transmitting terminal 110 may correspond to a device for transmitting various forms of data, for example, digital content, and may include, for example, a mobile device that may support a wired or wireless data communication.

In accordance with one or more exemplary embodiments, the data receiving terminal 120 may include a gesture input unit 121, a gesture determination unit 122, and a data communication unit 123. Further, the data receiving terminal 120 may correspond to a device for receiving various forms of data, for example, digital contents, and may include, for example, a mobile device that may support a wired or wireless data communication.

The data transmitting terminal 110 may transmit data to the data receiving terminal 120. In this exemplary embodiment, the data transmitting terminal 110 may receive an input of a gesture corresponding to a data transmission request from a user. Also, the data transmitting terminal 110 may transmit the data transmission request to the data receiving terminal 120 in response to the input of the corresponding gesture.

The data receiving terminal 120 may receive the data transmission request from the data transmitting terminal 110. Also, the data receiving terminal 120 may receive an input of a gesture corresponding to a data transmission acceptance from a user in response to the data transmission request being received.

Further, according to an exemplary embodiment, the mobile devices may provide a technique for requesting and accepting data transmission using a series of preset gestures.

Also, the mobile devices, according to an exemplary embodiment, may provide a technique for determining a type of data allowed to be requested, transmitted, received, and denied based on a security level of a gesture being input from a user, by presetting security levels corresponding to a series of preset gestures.

Further, the mobile devices, according to an exemplary embodiment, may provide a technique for transmitting various forms of data, for example, a game item and the like, in a more friendly and exciting manner through gesture-based interaction.

Additionally, the mobile devices according to an exemplary embodiment may provide a technique for authorizing a series of complex processes including security, access, and communication, for example, opening a socket, requesting an access, accepting the access, selecting a file, transmitting, and closing the file, using a gesture indicative of giving, taking, and other corresponding actions.

Hereinafter, a detailed description of the data transmitting terminal 110 and the data receiving terminal 120 according to an exemplary embodiment is provided.

The gesture input unit 111 may receive an input of a gesture associated with transmitting data. In this exemplary embodiment, the gesture input unit 111 may receive the input of the gesture from a user through various types of gesture sensors.

For example, the gesture input unit 111 may receive the input of the gesture using a touch sensor that may recognize at least one touch, an image sensor that may recognize a hand gesture, and a piezoelectric or gyroscopic sensor that recognized the movement of the sensor in response to the user input gesture. Also, the gesture input unit 111 may receive the input of the gesture using a sensor for measuring an electric current of a surface the gesture sensor is in contact with, for example, a human body.

The gesture input unit 111 may store information associated with the gesture that was input through the gesture sensor in a memory, and may provide the stored information to the gesture determination unit 112.

The gesture determination unit 112 may determine whether the input gesture corresponds to a preset gesture corresponding to a data transmission request. Here, the gesture corresponding to the data transmission request may be preset to various types. A further detailed description of the preset gesture corresponding to the data transmission request is provided with reference to FIGS. 3 through 6.

The data communication unit 113 may transmit the data transmission request to the data receiving terminal 120 based on a result of the determination by the gesture determination unit 112. For example, the data communication unit 113 may transmit the data transmission request to the data receiving terminal 120 when the input gesture is determined to correspond to the preset gesture corresponding to the data transmission request.

In this case, the data communication unit 123 may receive the data transmission request from the data transmitting terminal 110.

The gesture input unit 121 may receive an input of a gesture associated with transmitting data in response to the received data transmission request. In this exemplary embodiment, the gesture input unit 121 may receive an input of a gesture from a user through various types of gesture sensors.

For example, the gesture input unit 121 may receive the input of the gesture using a touch sensor that may recognize at least one touch, an image sensor that may recognize a hand gesture, and a piezoelectric or gyroscopic sensor that recognized the movement of the sensor in response to the user input gesture. Also, the gesture input unit 121 may receive the input of the gesture using a sensor for measuring an electric current in a human body.

The gesture input unit 121 may store information associated with the gesture input through the gesture sensor in a memory, and may provide the stored information to the gesture determination unit 122.

The gesture determination unit 122 may determine whether the input gesture corresponds to a preset gesture that corresponds to a data transmission acceptance. The gesture corresponding to the data transmission acceptance may be preset to various types. A further detailed description of the preset gesture corresponding to the data transmission acceptance is provided with reference to FIGS. 3 through 6.

The data communication unit 123 may transmit an acceptance signal, in response to the data transmission request, to the data transmitting terminal 110 based on a result of the determination by the gesture determination unit 122. For example, the data communication unit 123 may transmit the acceptance signal for responding to the data transmission request to the data transmitting terminal 110 when the input gesture is determined to correspond to the preset gesture corresponding to the data transmission acceptance.

The data communication unit 123 may transmit data to the data receiving terminal 120 in response to the corresponding acceptance signal being received.

Figure 2:
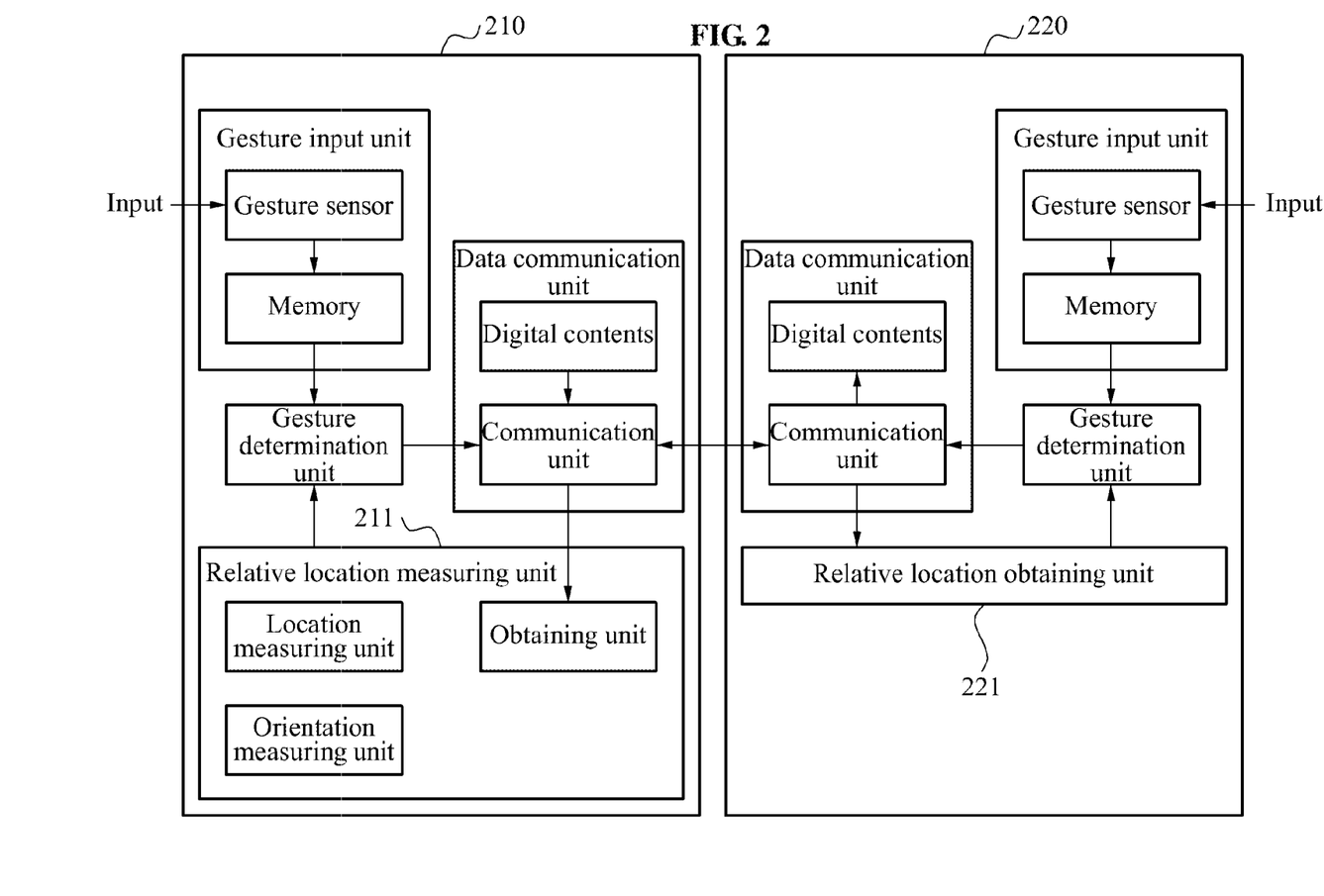
FIG. 2 is a block diagram illustrating a data transmitting terminal and a data receiving terminal using a gesture and a relative location according to an exemplary embodiment.

FIG. 2 is a block diagram that illustrates a data transmitting terminal 210 and a data receiving terminal 220 that use a relative location as an additional parameter when handling data content transmission and reception according to an exemplary embodiment.

Referring to FIG. 2, the data transmitting terminal 210 may further include a relative location measuring unit 211, and the data receiving terminal 220 may further include a relative location obtaining unit 221.

The relative location measuring unit 211 may measure a relative location of the data receiving terminal 220 relative to the data transmitting terminal 210.

The relative location measuring unit 211 may include a location measuring unit to measure a location of the data transmitting terminal 210, an orientation measuring unit to measure an orientation of the data transmitting terminal 210, and an obtaining circuit to obtain a location and an orientation of the data receiving terminal 220.

The relative location measuring unit may include a relative location calculating unit that is configured to calculate the relative location based on the location of the mobile device, the orientation of the mobile device, the location of the corresponding mobile device, and the orientation of the corresponding mobile device. Specifically, the relative location measuring unit 211 may calculate a relative location of the data receiving terminal 220 relative to the data transmitting terminal 210 based on a location of the data transmitting terminal 210, an orientation of the data transmitting terminal 210, a location of the data receiving terminal 220, and an orientation of the data receiving terminal 220.

For example, the relative location measuring unit 211 may calculate a relative location in which the data transmitting terminal 210 and the data receiving terminal 220 face one another. Further, the relative location measuring unit 211 may calculate that the relative location further includes the information that the data transmitting terminal 210 and the data receiving terminal 220 are parallel in the same direction and on the same plane, or a relative location may be found where the data transmitting terminal 210 and the data receiving terminal 220 are arranged vertically in either direction by a 180 degree rotation, or a relative location may be found where the data transmitting terminal 210 and the data receiving terminal 220 lie in the same plane, with corresponding displays facing the same direction, with the same upper edge being located adjacent to one another.

The data transmitting terminal 210 may determine whether an input gesture corresponds to a gesture corresponding to a data transmission request using the measured relative location of the data receiving terminal 220.

In this exemplary embodiment, a preset gesture corresponding to the data transmission request may include a gesture having a directionality based relative location for the data receiving terminal 220 relative to the data transmitting terminal 210.

The data transmitting terminal 210 may extract a direction of a gesture input from a user. The data transmitting terminal 210 may determine that the input gesture corresponds to the data transmission request when the extracted direction is directed towards the relative location of the data receiving terminal 220.

The relative location obtaining unit 221 may obtain a relative location of the data transmitting terminal 210 relative to the data receiving terminal 220. In this case, the relative location obtaining unit 221 may measure the relative location of the data transmitting terminal 210 in a similar manner to the relative location measuring unit 211.

The relative location obtaining unit 221 may receive a result of the measurement done by the relative location measuring unit 211 from the data transmitting terminal 210, and may calculate a relative location of the data transmitting terminal 210 based on the received result of the measurement.

The data receiving terminal 220 may determine whether the input gesture corresponds to a gesture corresponding to a data transmission acceptance using the obtained relative location of the data transmitting terminal 210.

In this exemplary embodiment, a preset gesture corresponding to the data transmission acceptance may include a gesture having a directionality based on the relative location of the data transmitting terminal 210 relative to the data receiving terminal 220.

For example, the data receiving terminal 220 may extract a direction of a gesture input from a user. The data receiving terminal 220 may determine that the input gesture corresponds to the data transmission acceptance when the extracted direction corresponds to a direction that meets a set of parameters relative to the location of the data transmitting terminal 210.

The mobile devices according to an exemplary embodiment may process the same gesture input through the location measuring unit and the orientation measuring unit differently. For example, a mobile device may execute different operations based on an orientation of the mobile device. Specifically, if the mobile device's orientation is such that it is lying flat, is placed on either side, or is set to stand upright on a desk, a different operation may be selected even though the same gesture is input by the user.

Figure 3A:
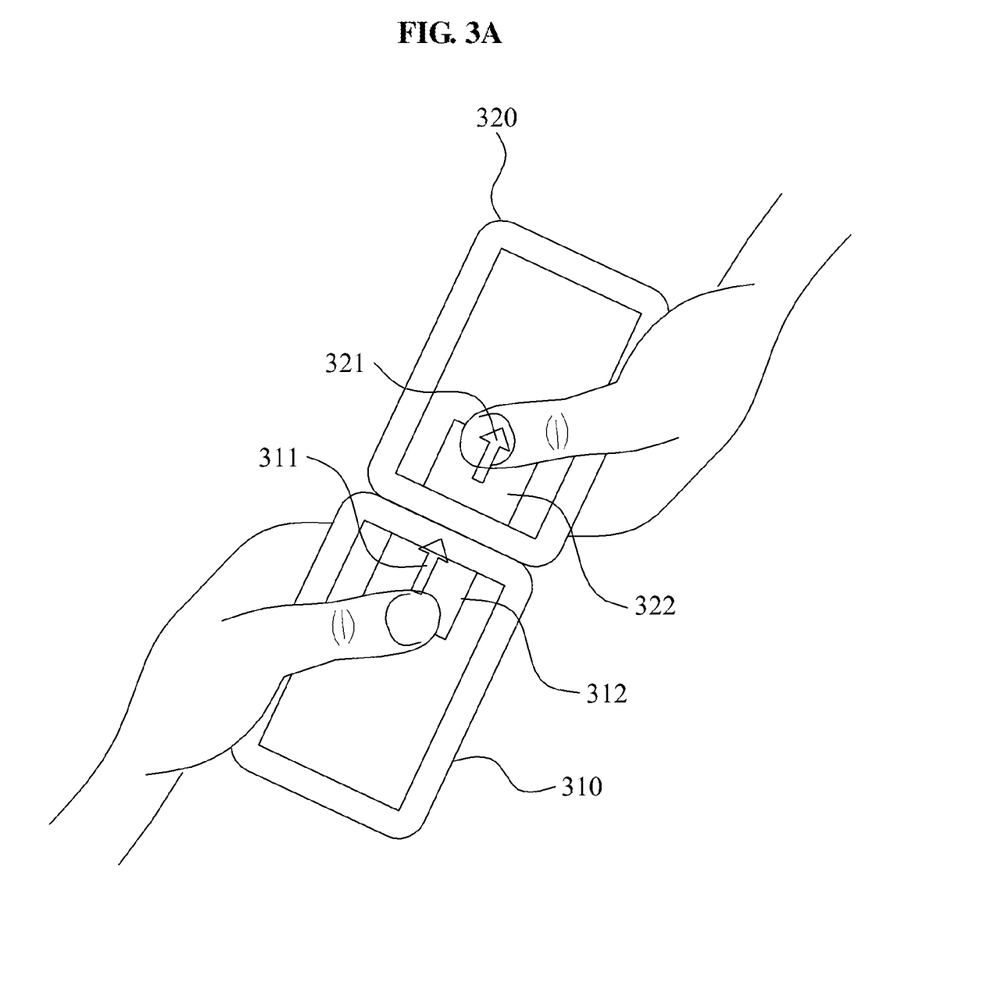
FIGS. 3A and 3B are schematic diagrams illustrating operations of a data transmitting terminal and a data receiving terminal using a gesture and a relative location according to one or more exemplary embodiments.
Figure 3B:
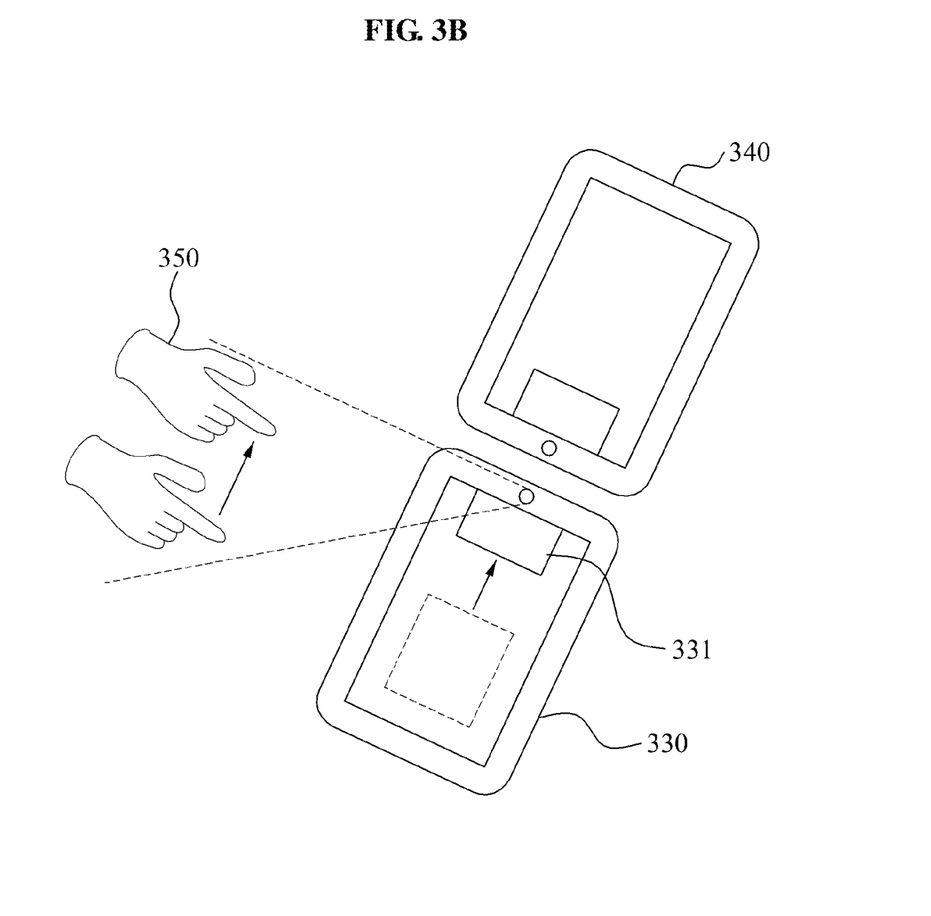

FIGS. 3A and 3B are schematic diagrams illustrating operations of a data transmitting terminal and a data receiving terminal using a relative location according to an exemplary embodiment.

Referring to FIG. 3A, the data transmitting terminal and the data receiving terminal may display an icon in a direction and a location corresponding to a movement of an gesture input using a relative location.

For example, when a user of a data transmitting terminal makes a gesture pushing an icon out of the field of view of a display screen of the data transmitting terminal, where the icon is pushed in a direction towards the position of a data receiving terminal, the icon may be displayed on an appropriate area of a display screen of the data receiving terminal in response to the gesture being input. Particularly, the portion of the display screen of the receiving terminal that is nearest the data transmitting terminal may display the incoming icon while visually maintaining the Euclidean vector properties relative to a user from one display screen to the other.

For example, a data transmitting terminal 310 and a data receiving terminal 320 may be disposed top-to-top such that the top of each phone is in contact and the phones are lying in the same plane with the display screens of each facing the same direction.

In this exemplary embodiment, the data transmitting terminal 310 may receive an input of a gesture moving in a direction 311 towards a relative location of the data receiving terminal 320. The data transmitting terminal 310 may transmit a data transmission request to the data receiving terminal 320 in response to the corresponding gesture being input.

In this case, the data transmitting terminal 310 may display a procedure where a data transmission request uses an image representing data intended to be transmitted.

Further, the data transmitting terminal 310 may measure a movement distance of the input gesture in the direction to the relative location of the data receiving terminal 320. The data transmitting terminal 310 may control a display to prevent the display of a portion of the image corresponding to the relative location of the data receiving terminal 320 in proportion to the measured movement distance. As a result, the data transmitting terminal 310 may display only a portion 312 of the corresponding image.

The data receiving terminal 320 may provide an interface to receive an input of a gesture corresponding to a data transmission acceptance in response to the data transmission request being received from the data transmitting terminal 310.

For example, the data receiving terminal 320 may control a remaining portion 322 of the corresponding image that is transitionally being sent in a display-to-display fashion. The remaining portion 322 that the data receiving terminal may control is the portion that corresponds to the part other than the portion still being displayed and controlled on the data transmitting terminal 310. In this case, a user of the data receiving terminal 320 may input the data transmission acceptance by inputting a gesture in a direction 321 consistent with the direction 311 of the gesture corresponding to the data transmission request from a location corresponding to the remaining portion 322.

According to one or more exemplary embodiments, the display control operation of the data receiving terminal 320 may be performed using various methods. By way of example, and in accordance with an exemplary embodiment, the data receiving terminal 320 may receive information associated with the image representing the data, information associated with the relative location, and information associated with the movement distance of the gesture in the direction to the relative location from the data transmitting terminal 310, and may control the display based on the received information. By way of another example, and in accordance with another exemplary embodiment, the data receiving terminal 320 may calculate the relative location of the data transmitting terminal 310 directly. By way of still another example, and in accordance with another exemplary embodiment, the data receiving terminal 320 may update a portion of the display, on which the corresponding image is displayed, based on the movement distance of the gesture corresponding to the data transmission acceptance in the direction 322, and may feed updated information back to the data transmitting terminal 310.

In contrast, the user of the data receiving terminal 320 may reject the data transmission request by inputting a gesture indicating the user's rejection of the data transmission request, for example, a gesture in a direction inconsistent with the direction 311 of the gesture corresponding to the data transmission request.

Particularly, in accordance with an exemplary embodiment, when a gesture in a direction opposite to the direction 311 of the gesture corresponding to the data transmission request is input, the data transmission request may be rejected. In accordance with another exemplary embodiment, the gesture may be a back and forth gesture perpendicular to the direction 311 indicating a "no" type gesture, or the user of the data receiving terminal 320 may simply not provide an acceptance input gesture which could be interpreted as a refusal of the transmission request.

According to an exemplary embodiment, the data transmitting terminal 310 and the data receiving terminal 320 may use various types of sensors.

For example, the data transmitting terminal 310 and the data receiving terminal 320 may receive the input of the gesture from the user using a touch sensor. The data transmitting terminal 310 and the data receiving terminal 320 may receive the input of the gesture from the user using an image sensor, a piezoelectric sensor, or gyroscopic sensor that recognized the movement of the sensor in response to the user input gesture.

According to another exemplary embodiment, the data transmitting terminal 310 may use a touch sensor while the data receiving terminal 320 may use an image sensor, and vice versa.

Referring to FIG. 3B, a data transmitting terminal 330 according to another exemplary embodiment may use an event-based image sensor. Here, the event-based image sensor may correspond to a device that may sense an image by detecting a preset event. A further detailed description of the event-based image sensor is provided with reference to FIGS. 6A and 6B.

The data transmitting terminal 330 may sense a hand gesture 350 of a user using the event-based image sensor, and may determine whether the corresponding gesture corresponds to a gesture associated with data transmission.

When the corresponding gesture is determined to correspond to the gesture associated with data transmission, the data transmitting terminal 330 may transmit a data transmission request to a data receiving terminal 340 in response to the corresponding gesture being input. In this case, the data transmitting terminal 330 may display a procedure for the data transmission request using an image 331 representing data intended to be transmitted.

In this exemplary embodiment, the sensors described with reference to FIGS. 3A and 3B are only exemplary, and are not intended to limit the configurations of the data transmitting terminals 310, 330 and the data receiving terminals 320, 340.

Figure 4:
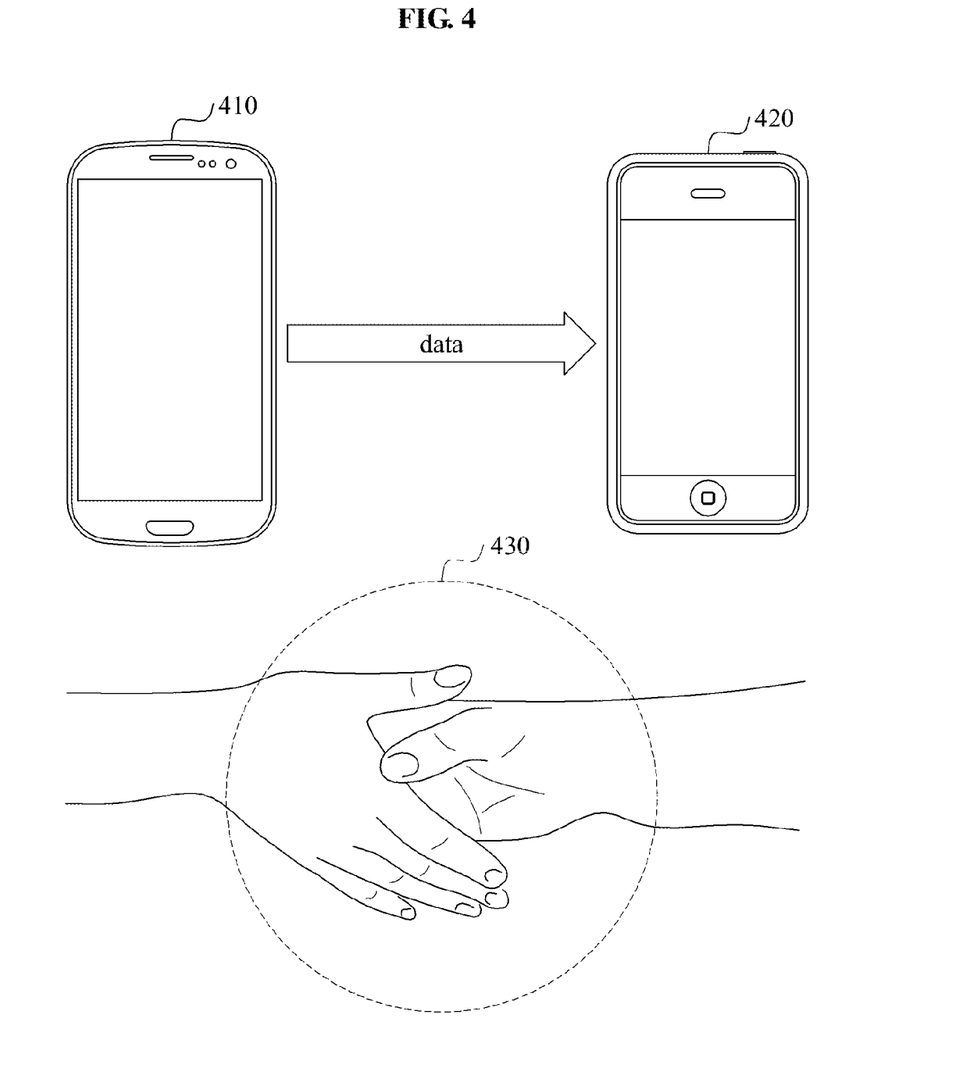
FIG. 4 is a schematic diagram illustrating a gesture of a data transmission request and a gesture of a data transmission acceptance being made in a mutually concurrent manner according to an exemplary embodiment.

FIG. 4 is a diagram illustrating a gesture of data transmission request and a gesture of data transmission acceptance being made in a mutually concurrent manner according to an exemplary embodiment.

Referring to FIG. 4, a data transmitting terminal 410 and a data receiving terminal 420 may recognize a gesture of an interaction between a user of the data transmitting terminal 410 and a user of the data receiving terminal 420.

In this exemplary embodiment, a preset gesture corresponding to a data transmission request and a preset gesture corresponding to a data transmission acceptance may include a mutual concurrent gesture.

For example, the data transmitting terminal 410 and the data receiving terminal 420 may sense a gesture 430 of a handshake between the two users. According to an exemplary embodiment, the data transmitting terminal 410 and the data receiving terminal 420 may sense the gesture 430 of the handshake between the two users using a sensor for measuring an electric current in a human body.

Further, in accordance with one or more exemplary embodiments, each of the data transmitting terminal 410 and the data receiving terminal 420 may recognize a plurality of gestures corresponding to different security levels. The data transmitting terminal 410 may determine a type of data intended to be transmitted based on a security level corresponding to the recognized gesture.

For example, the user of the data transmitting terminal 410 may set a security level to allow the user to exchange business cards with a person in a relationship of shaking hands. In this case, when the gesture 430 of the handshake between the two users is sensed, the data transmitting terminal 410 may transmit business card information of the user of the data transmitting terminal 410. According to another exemplary embodiment, personal information data such as pictures or scheduling may be transmitted to a person in a relationship of hugging or high-fiving the user of the data transmitting terminal 410.

Figure 5:
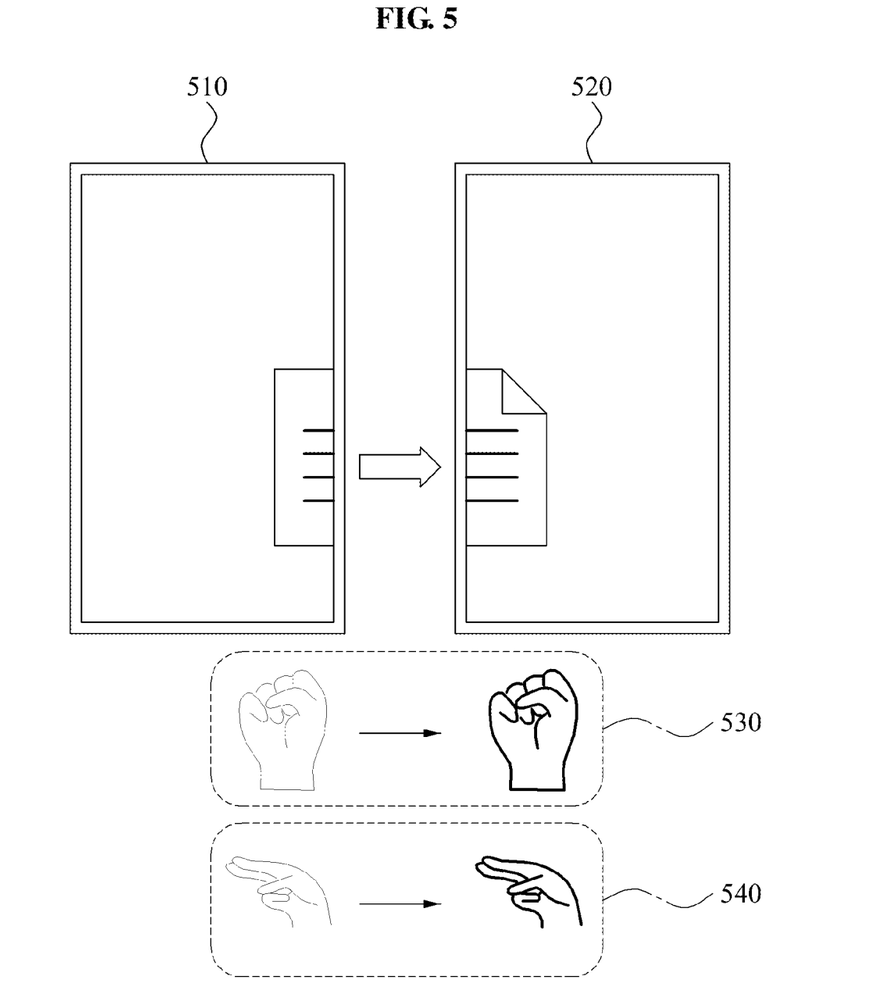
FIG. 5 is a schematic diagram illustrating a transmission mode corresponding to a pose and a gesture according to an exemplary embodiment.

FIG. 5 is a diagram illustrating a transmission mode corresponding to a pose and a gesture according to an exemplary embodiment.

Referring to FIG. 5, a data transmitting terminal 510 may extract a pose and a gesture associated with transmitting of data.

In this exemplary embodiment, the data transmitting terminal 510 may transmit data to a data receiving terminal 520 using a transmission mode corresponding to the extracted pose of the gesture among a plurality of preset data transmission modes.

For example, a user of the data transmitting terminal 510 may input a hand gesture 530 of a clenched first pose moving in a direction towards a relative location of the data receiving terminal 520. In this case, the data transmitting terminal 510 may extract the clenched first pose, and may transmit the corresponding data in a preset transmission mode corresponding to the clenched pose, for example, a "copy mode" in which data intended to be transmitted may be transmitted to an opposite terminal while not deleting, but retaining the corresponding data.

Also, the user of the data transmitting terminal 510 may input a hand gesture 540 of a scissors pose moving in a direction towards a relative location of the data receiving terminal 520. In this case, the data transmitting terminal 510 may extract the scissors pose, and may transmit the corresponding data in a preset transmission mode corresponding to the scissors pose, for example, a "move mode" in which data intended to be transmitted may be transmitted to an opposite terminal and then may be deleted.

Figure 6A:
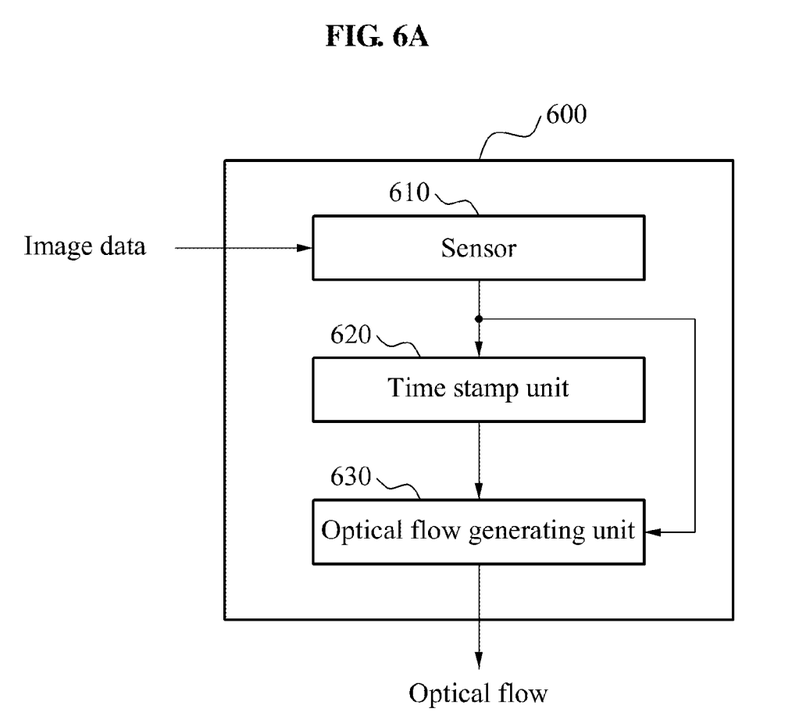
FIG. 6A is a block diagram of an event-based image sensor according to an exemplary embodiment.
Figure 6B:
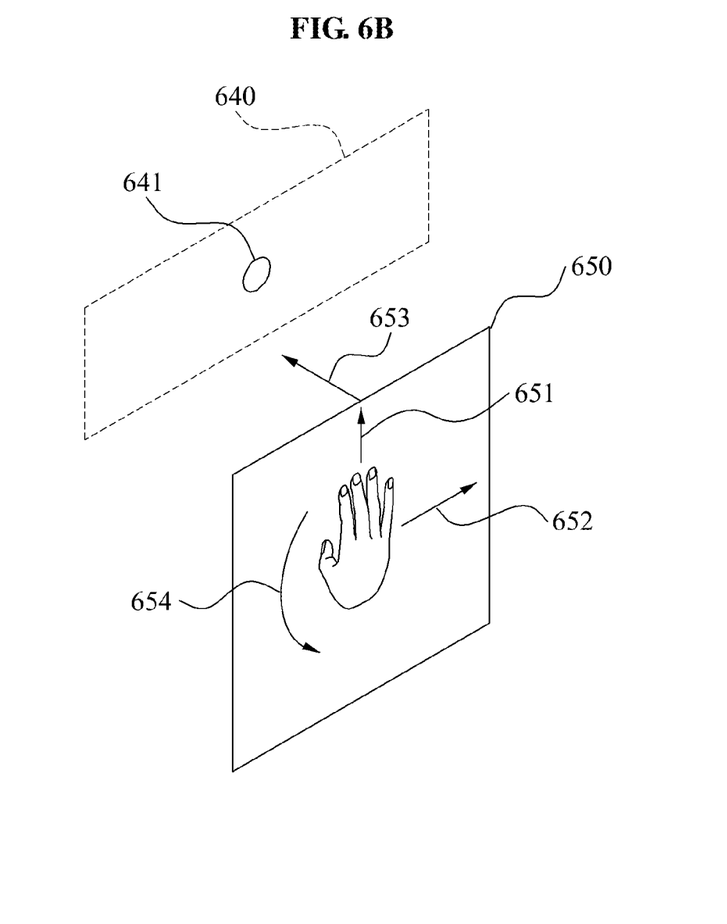
FIG. 6B is a schematic diagram illustrating an event-based image sensor according to an exemplary embodiment.

FIGS. 6A and 6B are diagrams illustrating an event-based image sensor 600 according to one or more exemplary embodiments.

Referring to FIG. 6A, the event-based image sensor 600 may include a sensor 610, a time stamp unit 620, and an optical flow generating unit 630.

The sensor 610 may receive an input of image data continuously, over time. In this exemplary embodiment, the sensor 610 may detect whether a preset event occurs for each of a plurality of pixels included in the input image data. Hereinafter, a pixel or pixels may include an image pixel or image pixels, respectively.

Here, the preset event may include at least one event among an event in which brightening is greater than or equal to a preset value during a unit time, hereinafter referred to as a brightening event, and an event in which darkening is greater than or equal to the preset value during the unit time, hereinafter referred to as a darkening event.

For example, the sensor 610 may detect whether an event associated with luminance occurs for each of the plurality of pixels included in the image data being input continuously.

Accordingly, the event-based image sensor 600 may only execute image processing on a pixel, in which a preset event, for example, an event associated with luminance occurs, so that a reduction in an amount of calculation to be performed may be achieved when compared to a case in which image processing is executed for all pixels per frame.

Further, the sensor 610 may output an event signal in response to the preset event being detected. Here, the event signal may correspond to an asynchronous signal based on the preset event, and may include information associated with at least one pixel in which the preset event occurs.

For example, when the sensor 610 detects brightening greater than or equal to the preset value in a first pixel of a location at coordinates (3,10) and a second pixel of a location at coordinates (20,20), the sensor 610 may output an event signal including the location of the first pixel and the location of the second pixel.

The time stamp unit 620 may receive the event signal output from the sensor 610.

The time stamp unit 620 may generate time stamp information by mapping at least one pixel corresponding to the event signal to a time in which the event signal is output.

Using information included in the received event signal, for example, information associated with at least one pixel in which the preset event occurs, the time stamp unit 620 may store a time, in which a new event occur, in the corresponding pixel.

That is, the time stamp unit 620 may store a time, in which a new event occurs in each of the plurality of pixels, based on the received event signal.

Accordingly, the time stamp information generated by the time stamp unit 620 may include information associated with a time in which the preset event occurs most recently for each of the plurality of pixels.

According to an exemplary embodiment, the time stamp unit 620 may only retain information associated with a time in which the preset event occurs most recently for each of the plurality of pixels. Specifically, the time stamp unit 620 may update a time stored in the corresponding pixel using a time in which a new event occurs based on information included in the received event signal, for example, information associated with at least one pixel in which the preset event occurs.

Accordingly, the event-based image sensor 600 may execute image processing using only information associated with a latest event for each pixel, without considering histories of events over time. The event-based image sensor 600 may provide an image processing technique with a reduced memory usage and a reduced amount of calculation to be performed.

A further detailed description of the time stamp information generated by the time stamp unit 620 is provided below.

The optical flow generating unit 630 may generate an optical flow based on the time stamp information generated by the time stamp unit 620 in response to the event signal being output from the sensor 610.

The optical flow may include a velocity vector of at least one pixel in which a new event occurs. That is, the optical flow may include a velocity vector of at least one pixel, in which the preset event occurs, among the plurality of pixels.

In this exemplary embodiment, the velocity vector may correspond to a two-dimensional vector having a predetermined direction and a predetermined magnitude on a two-dimensional plane composed of a plurality of pixels. A start location of the velocity vector may correspond to a location of the corresponding pixel.

For example, for a temporally continuous image obtained with a camera, in a case in which the camera moves with respect to an object or the object moves with respect to the camera, brightness of each pixel of the image may change, and the optical flow may include this brightness change in the image, in a form of a two-dimensional vector.

The time stamp information may include time information stored for each of the plurality of image pixels.

Further, only information associated with a time in which the preset event occurs most recently for each of the plurality of pixels may be maintained in the time stamp information.

For example, a time in which the preset event occurs most recently in a pixel of a location (i, j) may correspond to $T_{i,j}$, and a time in which the preset event occurs most recently in a pixel of a location (i, j+1) may correspond to $T_{i,j+1}$.

The time stamp unit 620 may update the time stamp information based on the event signal received from the sensor 610. In this case, the time stamp unit 620 may only perform updating on a pixel in which the preset event occurs, rather than all pixels.

According to an exemplary embodiment, the sensor 610 may detect the occurrence of the preset event in units of microseconds (μs). In this case, the time stamp unit 610 may store a time in which a new event occurs, for each pixel, in units of μs.

According to an exemplary embodiment, the optical flow generating unit 630 may include a neighboring pixel obtaining unit, a time difference calculating unit, a distance difference calculating unit, and an optical flow calculating unit.

The neighboring pixel obtaining unit may obtain a plurality of neighboring pixels with respect to a pixel in which the preset event occurs.

For example, the neighboring pixel obtaining unit may obtain eight neighboring pixels adjacent to a pixel in which the preset event occurs. According to another exemplary embodiment, the neighboring pixel obtaining unit may obtain eight neighboring pixels directly adjacent to a pixel in which the preset event occurs, and may further obtain sixteen neighboring pixels near the eight neighboring pixels.

The time difference calculating unit may calculate a time difference between at least one pixel in which the preset event occurs and neighboring pixels of the corresponding pixel using the time stamp information.

The time difference calculating unit may calculate a time difference between a pixel in which a new event occurs and neighboring pixels of the corresponding pixel. For example, when a new event occurs in a particular pixel, the time difference calculating unit may calculate a difference between a time $T_{i,j}$ stored in the corresponding pixel and a time $T_{i,j+1}$ stored in a neighboring pixel of the corresponding pixel.

In this case, $T_{i,j}-T_{i,j+1}$ may be greater than or equal to 0 because the time $T_{i,j}$ stored in the pixel corresponds to an updated value by the time stamp unit 620 in response to the new event having occurred. Further, $T_{i,j}-T_{i,j+1}$ may be equal to 0 when events occur concurrently.

The time difference calculating unit may calculate the time difference for each of the plurality of neighboring pixels obtained by the neighboring pixel obtaining unit.

When the calculated time difference is out of a preset window range, for example, 0.1 seconds, the time difference calculating unit may output 0 rather than the calculated time difference.

In particular, when the calculated time difference is out of a preset window range, for example, 0.1 seconds, the time difference calculating unit may regard the calculated time difference as meaningless information.

Accordingly, the optical flow generating unit may remove a factor that may act as a noise on a velocity vector of each pixel included in an optical flow.

The distance difference calculating unit may calculate information associated with a distance difference between at least one pixel in which the preset event occurs and neighboring pixels of the corresponding pixel.

The distance difference calculating unit may calculate a pixel distance between a pixel in which a new event occurs and neighboring pixels of the corresponding pixel. Here, the pixel distance may include a normalized distance between a plurality of image pixels. For example, the pixel distance between pixels may be 1.

The distance difference calculating unit may calculate the pixel distance for each of the plurality of neighboring pixels obtained by the neighboring pixel obtaining unit.

The optical flow calculating unit may calculate an optical flow based on information associated with the time difference calculated by the time difference calculating unit and information associated with the distance difference calculated by the distance difference calculating unit.

To calculate the optical flow, the optical flow calculating unit may calculate a two-dimensional vector A corresponding to a pixel in which the preset event occurs using information associated with the time difference and information associated with the distance difference, and may divide the two-dimensional vector A by an inner product of the two-dimensional vector A.

For example, the optical flow calculating unit may multiply information associated with the time difference by information associated with the distance difference for each neighboring pixel of a pixel in which the preset event occurs.

Subsequently, the optical flow calculating unit may calculate the two-dimensional vector A by calculating a sum of the results of the multiplication corresponding to the neighboring pixels. Here, a unit of the two-dimensional vector A may be "time/distance".

The optical flow calculating unit may calculate a velocity vector V included in the optical flow by dividing the two-dimensional vector A by the inner product of the two-dimensional vector A. Here, a unit of the velocity vector V may be "difference/time".

The optical flow calculating unit may generate the optical flow including the velocity vector V for each pixel, by calculating the velocity vector V for each pixel in which the preset event occurs.

As described in the foregoing, when a time difference between a pixel in which the preset event occurs and a neighboring pixel of the pixel is out of the preset window range, the time difference calculating unit may output 0. When time differences between a pixel in which the preset event and all neighboring pixels of the pixel are out of the preset window range, the two-dimensional vector A calculated by the optical flow calculating unit may be equal to 0.

In this case, the optical flow calculating unit may output a value of the velocity vector V to 0, rather than a calculated infinite value.

According to an exemplary embodiment, the event-based image sensor 600 may further include a calculating unit.

The calculating unit may calculate information for a user interface based on the optical flow generated by the optical flow generating unit 630.

Referring to FIG. 6B, and in accordance with an exemplary embodiment, the information for the user interface may include at least one of a first velocity Vx, a second velocity Vy, a third velocity Vz, and a fourth velocity ω. The first velocity Vx may represent a velocity when an object included in a plurality of image pixels moves in an x-axis direction 652 on a plane 650 parallel to a sensor plane 640 on which a sensor 641 is located. The second velocity Vy may represent a velocity when the object moves in a y-axis direction 651 on the plane 650. The third velocity Vz may represent a velocity when the object moves in a direction 653 perpendicular to the plane 650. The fourth velocity ω may represent a velocity when the object rotates in a clockwise or counterclockwise direction 654 on the plane 650.

According to another exemplary embodiment, the calculating unit may generate the information for the user interface even in a case in which the camera moves while the object remains motionless. In this case, a person having an ordinary skill in the art may appreciate that modifications, changes, or variations may be made in the exemplary embodiment from the above description, through a simple operation such as, for example, conversion of a sign of a result value, to generate the information for the user interface when the object stays still and the camera is in motion.

In this exemplary embodiment, the calculating unit may include a plane velocity calculating unit, an optical flow center calculating unit, a z-axis velocity calculating unit, and an angular velocity calculating unit.

The plane velocity calculating unit may calculate the first velocity Vx and the second velocity Vy based on the optical flow. The plane velocity calculating unit may calculate an average of the optical flow to calculate the first velocity Vx and the second velocity Vy.

As described in the foregoing, the optical flow may include a velocity vector of at least one pixel in which the preset event occurs. The plane velocity calculating unit may calculate an average of the optical flow by calculating a sum of the velocity vector of at least one pixel.

Here, the average of the optical flow may be a two-dimensional vector, because the velocity vector of the at least one pixel is a two-dimensional vector. The plane velocity calculating unit may calculate the first velocity Vx and the second velocity Vy by separating an x-axis component and a y-axis component from the calculated average of the optical flow.

The optical flow center calculating unit may calculate a center of the optical flow based on the optical flow. To calculate the center of the optical flow, the optical flow center calculating unit may perform a centroid calculation using a location of at least one pixel in which the preset event occurs and a magnitude of a velocity vector of the corresponding pixel included in the optical flow.

The optical flow center calculating unit may calculate the center c of the optical flow by substituting a location, for example, an x-axis pixel coordinate and a y-axis pixel coordinate, of each of a pixel 1, a pixel 2, a pixel 3, and a pixel 4, and a magnitude, for example, an x-axis direction magnitude and a y-axis direction magnitude, of each of a velocity vector $V_1$, a velocity vector $V_2$, a velocity vector $V_3$, and a velocity vector $V_4$, in Equation 1:

$$c = \left( \frac{\sum_i |V_{xi}| x_i}{\sum_i |V_{xi}|}, \frac{\sum_i |V_{yi}| y_i}{\sum_i |V_{yi}|} \right) \quad \text{[Equation 1]}$$

The z-axis velocity calculating unit may calculate the third velocity Vz based on the optical flow and the center of the optical flow.

Using a location of at least one pixel in which the preset event occurs and the center of the optical flow, the z-axis velocity calculating unit may generate a first vector of the corresponding pixel. The z-axis velocity calculating unit may calculate the third vector Vz by performing an inner product operation using the velocity vector of the corresponding pixel included in the optical flow and the first vector.

For example, the center of the optical flow calculated by the optical flow center calculating unit may be c, and the pixel may correspond to an i-th pixel among pixels in which the preset event occurs.

The z-axis velocity calculating unit may generate the first vector using the location of c and the location of the pixel. The z-axis velocity calculating unit may calculate the third vector Vz by substituting the first vector and the velocity vector of the i-th pixel in Equation 2:

$$V_z = \sum_i \vec{p}_i \cdot \vec{V}_i \quad \text{[Equation 2]}$$

When the object moves in the direction 653 towards the sensor 641, Vz calculated by the z-axis velocity calculating unit may have a positive value (+). In contrast, when the object moves in a direction facing away from the sensor 641, Vz may have a negative value (−).

The angular velocity calculating unit may calculate the fourth velocity ω based on the optical flow and the center of the optical flow.

Using a location of at least one pixel in which the preset event occurs and the center of the optical flow, the angular velocity calculating unit may generate a first vector of the corresponding pixel. Further, the angular velocity calculating unit may calculate the fourth velocity ω by performing an outer product operation using the velocity vector of the corresponding pixel included in the optical flow and the first vector.

For example, the center of the optical flow calculated by the optical flow center calculating unit may be c, and the pixel may correspond to an i-th pixel among pixels in which the preset event occurs.

The angular velocity calculating unit may generate the first vector using the location of c and the location of the pixel. The angular velocity calculating unit may calculate the fourth velocity ω by substituting the first vector and the velocity vector of the i-th pixel in Equation 3:

$$\omega = \sum_i \vec{p}_i \times \vec{V}_i \quad \text{[Equation 3]}$$

When the object rotates in the counterclockwise direction 654, w calculated by the angular velocity calculating unit may have a positive value (+). In contrast, when the object moves rotates in the counterclockwise direction 654, ω calculated by the angular velocity calculating unit may have a negative value (−).

The above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

A number of exemplary embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile device configured for data transmission to a corresponding mobile device, the mobile device comprising:
   a gesture input unit configured to receive a gesture;
   a relative location measuring unit configured to measure a relative location of the corresponding mobile device, based on an orientation of the mobile device and an orientation of the corresponding mobile device;
   a gesture determination unit configured to determine whether the gesture corresponds to a preset gesture associated with a command to perform data transmission to the corresponding mobile device, and whether the gesture corresponds to the relative location; and
   a data communication unit configured to transmit a data transmission request to the corresponding mobile device based on a result of the determination, configured to receive, from the corresponding mobile device, an acceptance signal indicating an input of an acceptance gesture at the corresponding mobile device, and configured to transmit data to the corresponding mobile device in response to receiving the acceptance signal.

2. The mobile device of claim 1, wherein the preset gesture corresponding to the data transmission request and the preset gesture corresponding to the data transmission acceptance comprise a directionality based on a relative location between the mobile device and the corresponding mobile device.

3. The mobile device of claim 1,
   wherein the gesture determination unit comprises:
   a directionality extracting unit configured to extract a directionality of the gesture associated with the data; and
   a directionality determining unit configured to determine whether the directionality is in a direction of the relative location to determine whether the gesture associated with the data corresponds to the preset gesture corresponding to the data transmission request.

4. The mobile device of claim 3, wherein the directionality determining unit is further configured to determine that the gesture associated with the data corresponds to the preset gesture that corresponds to the data transmission request in response to the directionality of the gesture being determined to be in the direction of the relative location, and in response to the preset gesture that corresponds with the data transmission acceptance also having the directionality.

5. The mobile device of claim 3, wherein the relative location measuring unit comprises:
   a location measuring unit configured to measure a location of the mobile device;
   an orientation measuring unit configured to measure the orientation of the mobile device;
   an obtaining unit configured to obtain a location of the corresponding mobile device and the orientation of the corresponding mobile device; and
   a relative location calculating unit configured to calculate the relative location based on the location of the mobile device, the orientation of the mobile device, the location of the corresponding mobile device, and the orientation of the corresponding mobile device.

6. The mobile device of claim 3, further comprising:
   a display configured to display an image representing the data transmission; and
   a display control unit configured to control the display to display an entirety or a portion of the image based on an output from the gesture determination unit.

7. The mobile device of claim 6, wherein the gesture determination unit further comprises:
   a movement distance measuring unit configured to measure a movement distance of the gesture associated with the data in a direction towards the relative location, and
   wherein the display control unit is further configured to control the display to display a portion of the image based on the direction towards the relative location and the movement distance.

8. The mobile device of claim 7,
wherein the data communication unit is configured to transmit the image, the direction towards the relative location, and the movement distance to the corresponding mobile device, and
wherein the corresponding mobile device is configured to display a remaining portion of the image based on the image, the direction towards the relative location, and the movement distance.

9. The mobile device of claim 8, wherein the preset gesture corresponding to the data transmission acceptance comprises the directionality of a location corresponding to the portion of the image.

10. The mobile device of claim 1, wherein the preset gesture corresponding to the data transmission request and the preset gesture corresponding to the data transmission acceptance comprise a mutually concurrent gesture.

11. The mobile device of claim 10, wherein the data transmission is determined based on a preset security level corresponding to the mutually concurrent gesture.

12. The mobile device of claim 10,
wherein the mutual concurrent gesture comprises a handshake gesture between a user of the mobile device and a user of the corresponding mobile device, and
wherein the data comprises business card information of the user of the mobile device.

13. The mobile device of claim 1, wherein the gesture determination unit is further configured to extract a pose of the gesture associated with the data transmission, and
the data communication unit is further configured to transmit the data to the corresponding mobile device using a transmission mode corresponding to the pose of the gesture among a plurality of preset data transmission modes.

14. The mobile device of claim 1, wherein the gesture input unit further comprises an event-based image sensor,
wherein the event-based image sensor comprises:
a sensor configured to detect a preset event occurring in a plurality of image pixels and configured to output an event signal in response to the detection;
a time stamp unit configured to generate time stamp information by mapping at least one pixel corresponding to the event signal to a time in which the event signal is output; and
an optical flow generating unit configured to generate an optical flow based on the time stamp information in response to the event signal being output.

15. The mobile device of claim 14, wherein the optical flow generating unit comprises:
a neighboring pixel obtaining unit configured to obtain neighboring pixels of the at least one pixel;
a time difference calculating unit configured to calculate information associated with a time difference between the at least one pixel and the neighboring pixels using the time stamp information;
a distance difference calculating unit configured to calculate information associated with a distance difference between the at least one pixel and the neighboring pixels; and
an optical flow calculating unit configured to calculate the optical flow based on the information associated with the time difference and the information associated with the distance difference.

16. A mobile device configured to receive data from a corresponding mobile device, the mobile device comprising:
a data communication unit configured to receive a data transmission request from the corresponding mobile device;
a gesture input unit configured to receive a gesture in response to the data transmission request being received;
a relative location obtaining unit configured to obtain a relative location of the corresponding mobile device relative to the mobile device measured based on an orientation of the mobile device and an orientation of the corresponding mobile device; and
a gesture determination unit configured to determine whether the gesture corresponds to a preset gesture associated with a data transmission acceptance, and whether the gesture corresponds to the relative location;
wherein the data communication unit is further configured to transmit an acceptance signal to the corresponding mobile device based on a result of the determination in response to the data transmission request, and is further configured to receive the data from the corresponding mobile device in response to the data communication unit transmitting the acceptance signal.

17. The mobile device of claim 16,
wherein the gesture determination unit comprises:
a directionality extracting unit configured to extract a directionality of the gesture associated with the data; and
a directionality determining unit configured to determine whether the directionality corresponds in a direction of the relative location to determine whether the gesture associated with the data corresponds to the preset gesture corresponding to the data transmission acceptance.

18. The mobile device of claim 16, wherein the preset gesture corresponding to the data transmission request and the preset gesture corresponding to the data transmission acceptance comprise a mutually concurrent gesture.

19. A method of a mobile device transmitting data in response to a gesture, the method comprising:
detecting a gesture at a sensor;
measuring, at the mobile device, a relative location of another mobile device, based on an orientation of the mobile device and an orientation of the another mobile device;
determining, at the mobile device, whether the gesture corresponds to a request gesture stored in a memory at the mobile device, and whether the gesture corresponds to the relative location;
transmitting a data transmission request to the other mobile device in response to the determining that the gesture corresponds to the request gesture and the relative location; and
transmitting data to the other mobile device in response to receiving a data transmission acceptance from the other mobile device.

20. A method of a mobile device receiving data in response to a gesture, the method comprising:
detecting a gesture at a sensor;
obtaining, at the mobile device, a relative location of another mobile device measured based on an orientation of the mobile device and an orientation of the another mobile device;
determining, at the mobile device, whether the gesture corresponds to an acceptance gesture stored in a memory of the mobile device, and whether the gesture corresponds to the relative location;

transmitting a data transmission acceptance to the other mobile device in response to receiving a data transmission request from the other mobile device and in response to the determining that the gesture corresponds to the acceptance gesture and the relative location; and receiving data from the other mobile device in response to transmitting the data transmission acceptance to the other mobile device.

\* \* \* \* \*